J. HUGILL.
Cultivator, Harrow, and Seed-Sower.

No. 218,975. Patented Aug. 26, 1879.

Witnesses
Geo. H. Strong,
Frank A. Brooks

Inventor
James Hugill
By Dewey & Co.
Attys

UNITED STATES PATENT OFFICE.

JAMES HUGILL, OF WOODBRIDGE, CALIFORNIA.

IMPROVEMENT IN CULTIVATOR, HARROW, AND SEED-SOWER.

Specification forming part of Letters Patent No. 218,975, dated August 26, 1879; application filed April 17, 1879.

*To all whom it may concern:*

Be it known that I, JAMES HUGILL, of Woodbridge, county of San Joaquin, and State of California, have invented an Improved Cultivator, Harrow, and Seed-Sower; and I hereby declare the following to be a full, clear, and exact description thereof, reference being made to the accompanying drawings.

My invention consists in an improved cultivator, harrow, and seed-sower combined, by means of which the operations of cultivating, harrowing, and seeding the ground may be performed at once and by the same implement.

Figure 1:
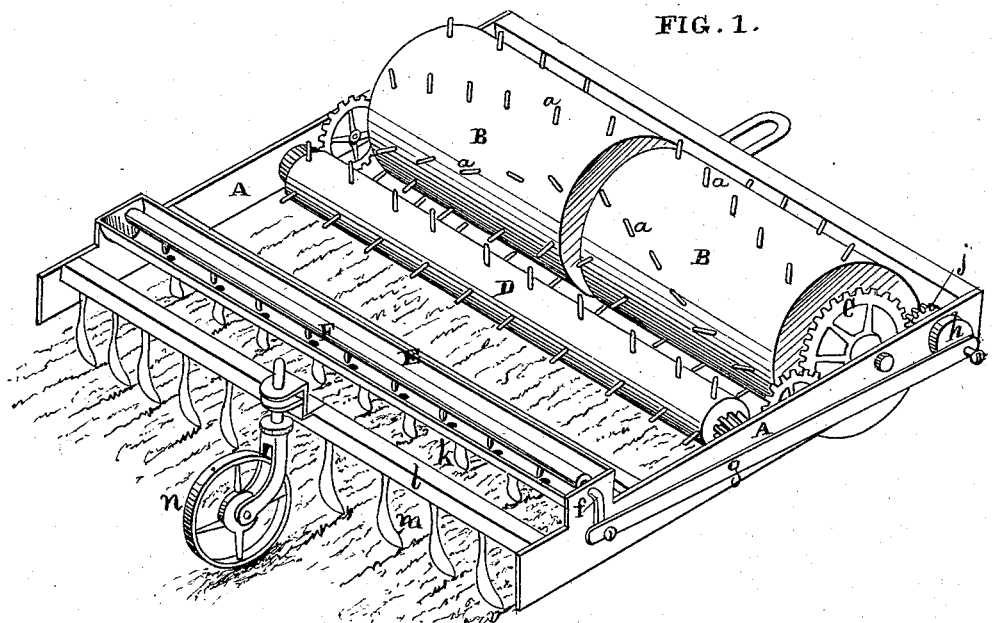
Figure 2:
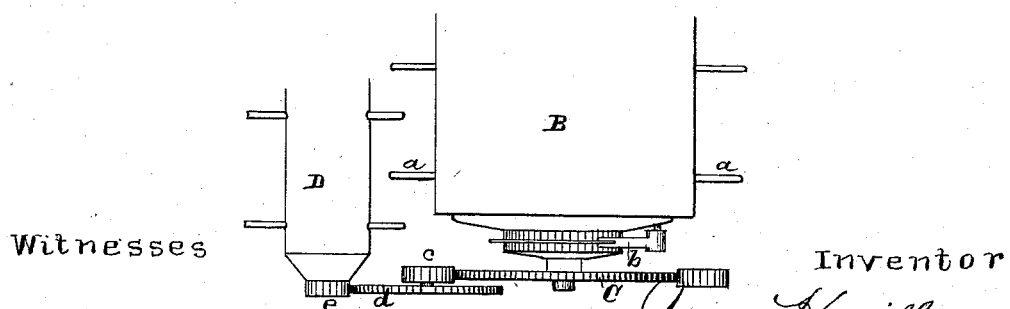

Figure 1 is a perspective view of my cultivator. Fig. 2 is a detail of the working-gear.

On an axle journaled to the frame A are two rollers, B, rotating freely on said axle, and arranged to operate independent of each other. On these rollers are placed, in diagonal lines, a series of teeth, $a$, arranged in the manner shown, so that at no time will some of the teeth fail to be in contact with the ground, so as to rotate the rollers.

On the outer end of each roller is a plate carrying a pawl, $b$, which engages with a ratchet which is secured to the spur-wheel C. When the cultivator is being drawn straight ahead this ratchet and pawl are inoperative; but on turning corners it admits of one of the rollers turning back on its shaft without operating the spur-wheel C. This spur-wheel meshes with a pinion, $c$, provided with a gear, $d$, said gear, in turn, operating the pinion $e$ on the harrow-roller D.

The same arrangement of gearing is provided at opposite sides of the frame on the rollers, so that the harrow-roller D is rotated very rapidly.

On this harrow D are a series of teeth, so arranged that one or more of the series will pass between each row of those on the large roller B. This will not only keep the teeth free from weeds and the roller clean, but will tear up and break any lumps which may find lodgment between the teeth.

Across the top of the frame, near the rear end, is a seed-trough, E, perforated at its bottom, as shown, and provided with a rock-shaft, F, having stirrers or teeth, which are in a position to be over each of the perforations or holes.

This rock-shaft has a crank, $f$, at its outer end, and a rod, $g$, connects it with a crank, $h$, at the other end of the frame. The crank $h$ is connected with a pinion, $j$, meshing with the spur-wheel of the roller, so that as the roller revolves, the rock-shaft is moved back and forth, its teeth cleaning the holes in the seed-trough and stirring the seed, so it will not choke.

Across the frame, in front of the seed-box, is a bar carrying the teeth $k$, which run drills or furrows in the soil in line with the holes through which the seed drops. A rear bar, $l$, carries the teeth $m$, for covering the seed up, these latter teeth being set out of line from the front ones.

On the rear bar, $l$, is a caster-wheel, $n$, for facilitating turning and for supporting the machine.

As the implement is drawn over the ground by the horses, the teeth on the large rollers impinge on the ground and rotate said rollers, thus revolving the spur-wheels connected by the gearing described with the rotary harrow. The teeth on this harrow D pass between those of the large rollers and tear and break up the lumps of earth, so as to pulverize them and leave the ground in proper condition for the seed. The teeth $k$, following the harrow, cut furrows, into which the seed from the seed-trough drops, the toothed rock-shaft in said trough operating, as described, to keep the perforations clear. Then the teeth in the rear bar, running between the furrows previously made, cover up the seed. In this way the ground is harrowed, cultivated, and seeded all at one operation, and by the one implement.

The rear bar, carrying the caster-wheel, may be made adjustable, so as to regulate the height of the rear end of the combined implement from the ground.

Having thus described my invention, what I claim as new, and desire to secure by Letters Patent, is—

The independent diagonally-toothed rollers B, provided with the pawls $b$, with the ratchet and spur wheels C, geared to the continuous rotary harrow D, in combination with the perforated seed-hopper E, with its rock-shaft F, crank $f$, connecting-rod $g$, crank $h$, and pinion $j$, and the furrowing and covering teeth $k$ $m$, substantially as herein described.

In witness whereof I have hereunto set my hand.

JAMES HUGILL.

Witnesses:
GEO. H. STRONG,
FRANK A. BROOKS.